Patented Oct. 2, 1951

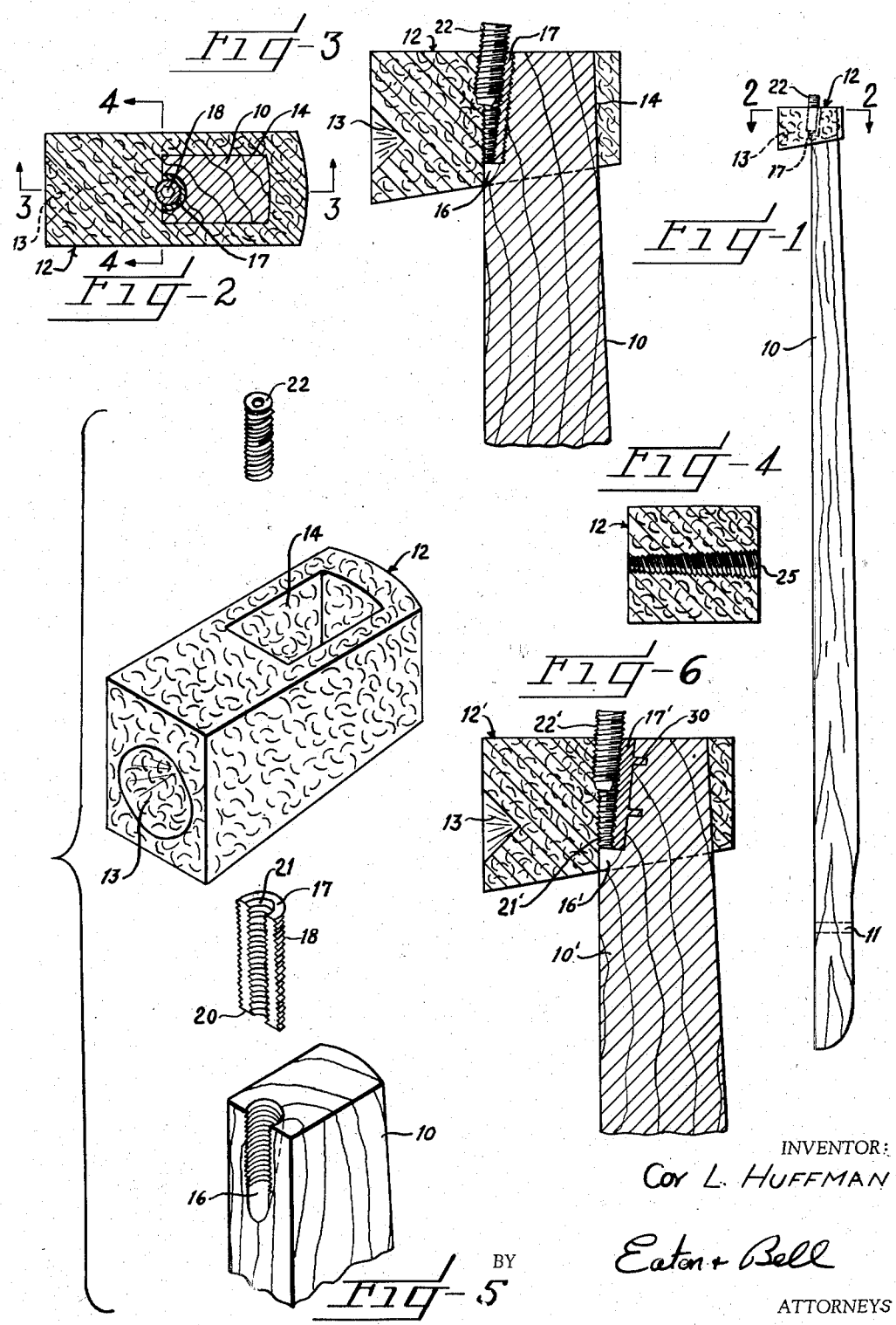

2,569,994

UNITED STATES PATENT OFFICE 2,569,994

PICKER MOUNTING MEANS

Coy L. Huffman, Greenville, S. C.

Application August 28, 1950, Serial No. 181,724

5 Claims. (Cl. 139—159)

This invention relates to an improved means for mounting a picker on a picker stick in a loom. Pickers have heretofore been mounted on the upper end of a picker stick by means of the rear portion of the picker having a hole therethrough and a wood screw being passed through this hole and imbedded in a suitable hole in the edge of the picker stick. It is necessary from time to time to adjust the position of the picker relative to the upper end of the picker stick and minute adjustments could not be made due to the fact that a picker would have to be moved a sufficient distance to form a complete new hole in the picker stick for the wood screw. Means have been provided in my co-pending application Serial Number 792,487, now Patent Number 2,524,443, for overcoming this and providing means for adjustably mounting a picker on a picker stick.

It is an object of this invention to provide an improved means for securely fastening a picker to the upper end of the picker stick in adjusted position and whereby the picker can be adjusted in a different position either up or down a picker stick in minute amounts without in any way affecting the secure adjustment of the same.

It is an object of this invention therefore to provide in the upper front surface of the picker stick a vertically disposed groove or cavity in which a sleeve is fixedly secured, said sleeve being provided with threads or other suitable projections thereon for securing the same in the cavity in the picker stick and the internal portion of said sleeve also being provided with a plurality of threads. A portion of the sleeve is cut away so that it is flush with the surface of the picker stick to thus permit a screw to be threadably mounted in the internally threaded portion of the sleeve so that the threads of the screw will extend beyond the surface of the picker through the cut away portions of the sleeve and will engage the adjacent surface of the picker to hold the picker in fixed relation to the picker stick, and to thus permit minute adjustment of the picker relative to the picker stick by adjustment of said screw.

Some of the objects of the invention having been stated, other objects will appear as the description proceeds, when taken in connection with the accompanying drawings, in which—

Figure 1 is an elevation of a picker stick and showing a picker secured thereon by my improved means;

Figure 2 is a sectional plan view taken along the line 2—2 in Figure 1;

Figure 3 is a vertical sectional view taken along the line 3—3 in Figure 2;

Figure 4 is a vertical sectional view taken along the line 4—4 in Figure 2;

Figure 5 is an exploded isometric view of the upper end of the picker stick, the guiding sleeve, the picker, and the securing screw before the same are assembled;

Figure 6 is a vertical sectional view similar to Figure 3 but showing a modified means for securing the sleeve in the picker stick.

Referring more specifically to the drawings the numeral 10 indicates a conventional picker stick, the lower end of which is adapted to be secured in a conventional manner to a shoe by means of a bolt fastened through a hole 11 in the lower end of the picker stick. On the upper end of a picker stick there is mounted a conventional picker 12 formed of layers of cloth impregnated with rubber vulcanized together or in any other suitable manner and being provided with a cavity 13 in the front face thereof for receiving the nose of a shuttle. The picker 12 must be adjusted relative to the picker stick 10 to permit the nose of the shuttle to coincide with the cavity 13.

The picker has a vertically disposed opening 14 therein for reception of the picker stick 10. Instead of securing the picker to the picker stick by a wood screw penetrating a hole in the back portion of the picker, the picker is secured to the picker stick in a manner similar to that shown in my co-pending application Serial Number 792,487, now Patent Number 2,524,443, by means of a screw being positioned between the front face of the picker stick 10 and the proximate face of the picker 12. However in practice it has sometimes been difficult to insert a screw as described in my said co-pending application and therefore I have provided an improved guide for said screw to facilitate insertion of the same and to provide a more effective securing means.

To this end, the upper end of the picker stick 10 is provided with a suitable vertically extending cavity 16 into which a sleeve 17 is adapted to be secured. The sleeve 17 may be secured in the slot or cavity 16 by any suitable means and in Figures 1 to 5 the sleeve 17 is shown as being provided with a plurality of external threads 18 adapted to engage the surface of the cavity 16 to fixedly secure the sleeve 17 therein. The sleeve 17 is cut away throughout its length a portion preferably equal to substantially one-fourth its circumference so that the sleeve is concavo-convex and the edges of the sleeve are flat as at 20 and when the sleeve 17 is properly positioned in the picker stick 10 the flat edges 20 of the sleeve 17 will be flush with the front face of the picker 10.

The sleeve 17 is also provided with a plurality of internal threads 21 adapted to receive an externally threaded screw 22. It will thus be observed that when the sleeve 17 is positioned in the picker stick 10, the picker 12 may be positioned on the upper end of the picker stick 10 and the screw 22 may be partially inserted in the upper end of the sleeve 17, the threads of the screw 22 also engaging the proximate surfaces of the picker 12. The screw may then be tightened and the internal threads 21 of the sleeve 17 will serve to guide the same and hold it securely in position as the screw 22 is tightened, the threads thereof will cut corresponding threads in the proximate surface of the picker 12 to thus hold the picker 12 securely in fixed relation to the picker stick 10. When it is desired to adjust the picker 12 relative to the picker stick 10 the screw 22 may be tightened or loosened as desired, to permit relative adjustment of the same.

The vertically extending cavity 16 in the picker stick 10 preferably extends at an angle, that is, it is more shallow at its lower end than at its upper end, and the sleeve 17 is cut away at 20 at an angle so that the sleeve is wider at the top than at the bottom thus causing the screw 22 to cut relatively shallow threads in the picker 12 at the top thereof and to cut progressively deeper threads in the picker 12 as it is driven home thus effectively securing the picker 12 to the picker stick 10.

If desired, instead of mutilating or marring the surface of the picker which fits against the front edge of the picker stick, the picker 12 may be molded with a suitable groove therein having female threads 25 for receiving the front portion of the screw 22, as provided in my said co-pending application.

Referring to Figure 6, there will be observed a slightly modified form of the improved picker mounting and like parts bear like reference characters as the parts previously described, with the prime notation added. The picker stick 10' is provided with a cavity 16' and secured in this cavity 16' is a sleeve 17', the sleeve 17' being provided with at least one and preferably a plurality of projections 30 on the outer circumference thereof, said projections 30 thereon imbedded in the proximate surface of the picker stick 10' to securely hold the sleeve 17' within the cavity 16 of the picker stick 10'. The picker 12' is secured on the upper end of the picker stick 10' by means of a screw 22', substantially as heretofore described, the sleeve 17' being provided with internal threads 21' adapted to receive the screw 22'.

It is thus seen that there is provided improved means for securing a picker on the upper end of a picker stick by means of a screw being driven between the front surface of the picker stick and the proximate surface of the picker and said screw being guided and held securely in position by means of an internally threaded sleeve secured in a cavity in the front portion of said picker.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In combination, a picker stick for looms and a picker mounted on the upper end thereof, the front surface of the upper end of the picker stick having a vertically extending groove therein, a concavo-convex sleeve secured in said vertically extending groove with its edges flush with the front portion of said picker stick, said sleeve being internally threaded, and an externally threaded screw adapted to fit within the sleeve so that a portion of said screw will extend beyond the front surface of said picker stick to engage and cut female threads in the proximate surface of the picker as the screw is driven home in the sleeve.

2. In combination, a picker stick for looms and a picker mounted on the upper end thereof, the front surface of the upper end of the picker stick having a vertically extending groove therein becoming shallower as it progresses downwardly, a tapered concavo-convex sleeve secured in said vertically extending groove, and having its edges flush with the front portion of said picker stick, said sleeve being internally threaded, and an externally threaded screw adapted to fit within the sleeve so that a portion of said screw will extend beyond the front surface of said picker stick to engage and cut female threads in the proximate surface of the picker as the screw is driven home in the sleeve.

3. In combination, a picker stick for looms and a picker mounted on the upper end thereof, the front surface of the upper end of the picker stick having a vertically extending groove therein, a concavo-convex sleeve secured in said vertically extending groove with its edges flush with the front portion of said picker stick, said sleeve being internally threaded, said sleeve also having external threads for securing the same within the vertically extending groove, and an externally threaded screw adapted to fit within the sleeve so that a portion of said screw will extend beyond the front surface of said picker stick to engage and cut female threads in the proximate surface of the picker as the screw is driven home in the sleeve.

4. In combination, a picker stick for looms and a picker mounted on the upper end thereof, the front surface of the upper end of the picker stick having a vertically extending groove therein becoming shallower as it progresses downwardly, a tapered concavo-convex sleeve secured in said vertically extending groove and having its edges flush with the front portion of said picker stick, and said sleeve being internally threaded, said sleeve having projections on the exterior thereof for securing the same within the vertically extending groove, and an externally threaded screw adapted to fit within the sleeve so that a portion of said screw will extend beyond the front surface of said picker stick to engage and cut female threads in the proximate surface of the picker as the screw is driven home in the sleeve.

5. In combination, a picker stick for looms and a picker mounted on the upper end thereof, the front surface of the upper end of the picker stick having a vertically extending groove therein becoming shallower as it progresses downwardly, a tapered concavo-convex sleeve secured in said vertically extending groove and having its edges flush with the front portion of said picker stick, said sleeve being internally threaded, said sleeve having at least one radially extending projection on the exterior thereof, said picker stick having at least one cavity therein adapted to receive said projection for securing the sleeve against vertical movement and rotational movement in the picker stick, and a screw adapted to fit within the sleeve so that a portion of said screw will extend beyond the front surface of said picker stick to engage and cut female threads in the proximate surface of the picker as the screw is driven home in the sleeve.

COY L. HUFFMAN.

REFERENCES CITED

The following references are of record in the file of this patent:

UNITED STATES PATENTS

| Number | Name | Date |
|---|---|---|
| 739,136 | Appleton | Sept. 15, 1903 |
| 2,222,351 | Lewis | Nov. 19, 1940 |
| 2,460,643 | Lazar | Feb. 1, 1949 |
| 2,467,284 | Williams | Apr. 12, 1949 |